United States Patent [19]
Bala et al.

[11] Patent Number: 5,522,019
[45] Date of Patent: May 28, 1996

[54] METHODS AND APPARATUS FOR EFFICIENTLY GENERATING ISOSURFACES AND FOR DISPLAYING ISOSURFACES AND SURFACE CONTOUR LINE IMAGE DATA

[75] Inventors: Gregory P. Bala, San Jose, Calif.; Koji Koyamada, Kanagawa, Japan

[73] Assignee: International Business Machines Corporation, Armonk, N.Y.

[21] Appl. No.: 502,686

[22] Filed: Jul. 14, 1995

Related U.S. Application Data

[63] Continuation of Ser. No. 844,805, Mar. 2, 1992, abandoned.
[51] Int. Cl.$^6$ .................................................. G06T 17/00
[52] U.S. Cl. ........................ 395/124; 395/119; 395/120
[58] Field of Search ................................. 395/119, 121, 395/ 124, 120, 131, 133

[56] References Cited

U.S. PATENT DOCUMENTS

| | | | |
|---|---|---|---|
| 4,697,178 | 9/1987 | Heckel | 340/729 |
| 4,775,946 | 10/1988 | Anjyo | 364/522 |
| 4,791,583 | 12/1988 | Colburn | 364/522 |
| 4,797,842 | 1/1989 | Nackman et al. | 364/578 |
| 4,829,456 | 5/1989 | Joonishi et al. | 364/522 |
| 4,901,252 | 2/1990 | Fitzgerald et al. | 364/522 |
| 5,113,357 | 5/1992 | Johnson et al. | 395/124 |
| 5,113,490 | 5/1992 | Winget | 395/119 |
| 5,201,035 | 4/1993 | Stytz et al. | 395/124 X |

FOREIGN PATENT DOCUMENTS

| | | |
|---|---|---|
| 60-198690 | 10/1985 | Japan . |
| 3127188 | 5/1991 | Japan . |
| 3202981 | 9/1991 | Japan . |

OTHER PUBLICATIONS

Koyamada, IBM Technical Disclosure Bulletin, Method to Reconstruct Solid Elements into Linear Tetrahedral Elements, vol. 32, No. 1, Jun. 1989.

Schreiber, Computing a Set of Triangular Plates which Represent a Potential Surface of a Scalar Function Defined at the Vertices of a Three–Dimensional Cartesian Mesh. IBM Tech. Disclosure Bul., vol. 18, No. 4, Sep. 1975.

P. Lancaster et al., Curve and Surface Fitting, Dept. of Math. & Statistics, Univ. of Calgary, Canada, Academic Press.

Kodie et al., A Novel Triangulation Method of Equi–Valued Surface Based on Tetrahedral Grids, Tokyo Res. Lab., TR87– 1017, Dec. 14, 1987.

DeSalvo et al., Ansys Engineering Analysis System User's Manual, vol. I, Swanson Analysis Sys., Inc. PA, May 1, 1989.

Koide et al., Polyhedral Approximation Approach to Molecular Orbital Graphics, IBM Japan Ltd., Science Institute, pp. 149–159.

R. S. Gallagher, Span Filtering: An Optimization Scheme for Volume Visualization of Large Finite Element Models, Proceedings Visualization 91, IEEE Comp. Soc. Tech. Committee on Computer Graphic, Oct. 22–25, 1991.

(List continued on next page.)

*Primary Examiner*—Heather R. Herndon
*Assistant Examiner*—Cliff N. Vo
*Attorney, Agent, or Firm*—James C. Pintner; Joseph J. Kaliko

[57] ABSTRACT

Methods and apparatus are provided for generating isosurfaces, given input data that includes (1) the representation of a set of points in three-dimensional space; (2) connectivity information with respect to the set of points and (3) a scalar field. The methods and apparatus allow the desired isosurfaces to be produced efficiently on all hardware platforms, including those not equipped to rapidly generate such isosurfaces using normally computation intensive processes, by utilizing a precomputed isofacet configuration table and predefined tetrahedron component labeling data (preset relationships among the vertices, edges and faces of a tetrahedron). Further aspects of the methods and apparatus include (1) methods and apparatus which support the selective display of isosurface and contour line images, and (2) methods and apparatus which utilize parallel processing techniques to enhance the efficiency of the isosurface generation process.

35 Claims, 10 Drawing Sheets

OTHER PUBLICATIONS

K. Koyamada & T. Nishio, Volume Visualization of 3D Finite Element Method Results. IBM Journal, pp. 12–25.

K. Koyamada, Volume Visualization for the Unstructured Grid Data, Proceedings Extracting Meaning from Complex Data: Processing Display, Interaction, SPIE–The Inter. Soc. for Optical Eng., vol. 1259, pp. 14–25, Feb. 14–16, 1990.

A. Wallin & G. Gerig, Automatic Construction of Iso–Surfaces from Volume Data, In: Proc. 4th Symp. on Spatial Data Handling, Zurich, 23–27 Jul. 1990.

| NODE | VALUE | NODE | VALUE |
|---|---|---|---|
| 1 | 1.0 | 33 | 25.0 |
| 2 | 1.5 | 34 | 25.5 |
| 3 | 2.5 | 35 | 26.5 |
| 4 | 3.0 | 36 | 27.0 |
| 5 | 3.0 | 37 | 27.0 |
| 6 | 3.5 | 38 | 27.5 |
| 7 | 4.5 | 39 | 28.5 |
| 8 | 5.0 | 40 | 29.0 |
| 9 | 7.0 | 41 | 31.0 |
| 10 | 7.5 | 42 | 31.5 |
| 11 | 8.5 | 43 | 32.5 |
| 12 | 9.0 | 44 | 33.0 |
| 13 | 9.0 | 45 | 33.0 |
| 14 | 9.5 | 46 | 33.5 |
| 15 | 10.5 | 47 | 34.5 |
| 16 | 11.0 | 48 | 35.0 |
| 17 | 9.0 | 49 | 33.0 |
| 18 | 9.5 | 50 | 33.5 |
| 19 | 10.5 | 51 | 34.5 |
| 20 | 11.0 | 52 | 35.0 |
| 21 | 11.0 | 53 | 35.0 |
| 22 | 11.5 | 54 | 35.5 |
| 23 | 12.5 | 55 | 36.5 |
| 24 | 13.0 | 56 | 37.0 |
| 25 | 15.0 | 57 | 39.0 |
| 26 | 15.5 | 58 | 39.5 |
| 27 | 16.5 | 59 | 40.5 |
| 28 | 17.0 | 60 | 41.0 |
| 29 | 17.0 | 61 | 41.0 |
| 30 | 17.5 | 62 | 41.5 |
| 31 | 18.5 | 63 | 42.5 |
| 32 | 19.0 | 64 | 43.0 |

FIG. 4

| VALUE | EDGES | FACES |
|---|---|---|
| V1 | e1 = (v1, v2) | f1 = (v1, v2, v3) = (e1, e2, e4) |
| V2 | e2 = (v1, v3) | f2 = (v1, v2, v4) = (e1, e3, e5) |
| V3 | e3 = (v1, v4) | f3 = (v1, v3, v4) = (e2, e3, e6) |
| V4 | e4 = (v2, v3) | f4 = (v2, v3, v4) = (e4, e5, e6) |
|  | e5 = (v2, v4) |  |
|  | e6 = (v3, v4) |  |

602   603   604

FACES BETWEEN EDGES

|  | e1 | e2 | e3 | e4 | e5 | e6 |
|---|---|---|---|---|---|---|
| e1 | 00* | f1 | f2 | f1 | f2 | 00 |
| e2 | f1 | 00 | f3 | f1 | 00 | f3 |
| e3 | f2 | f3 | 00 | 00 | f2 | f3 |
| e4 | f1 | f1 | 00 | 00 | f4 | f4 |
| e5 | f2 | 00 | f2 | f4 | 00 | f4 |
| e6 | 00 | f3 | f3 | f4 | f4 | 00 |

605

*00 ▶ EDGE INDICES DO NOT BOUND A VALID FACE.

| | 6 LOWER-ORDER BIT POSITIONS → EDGES CROSSED | | | | | |
|---|---|---|---|---|---|---|
| ... | EDGE 6 | EDGE 5 | EDGE 4 | EDGE 3 | EDGE 2 | EDGE 1 |

| | | INDEX* | FACET COUNT | EDGE TRIPLETS → FACET VERTEX LOCATIONS |
|---|---|---|---|---|
| 1 | 0 0 0 0 0 1 1 1 | = 7 | 1 | (1, 2, 3) |
| 2 | 0 0 0 0 1 0 1 1 | = 11 | 1 | (1, 2, 4) |
| 3 | 0 0 0 0 1 1 1 1 | = 15 | 2 | (1, 2, 3), (1, 2, 4) |
| 4 | 0 0 0 1 0 1 0 1 | = 21 | 1 | (1, 3, 5) |
| 5 | 0 0 0 1 0 1 1 1 | = 23 | 2 | (1, 2, 3), (1, 3, 5) |
| 6 | 0 0 0 1 1 0 0 1 | = 25 | 1 | (1, 4, 5) |
| 7 | 0 0 0 1 1 0 1 1 | = 27 | 2 | (1, 2, 4), (1, 4, 5) |
| 8 | 0 0 0 1 1 1 0 1 | = 29 | 2 | (1, 3, 5), (1, 4, 5) |
| 9 | 0 0 0 1 1 1 1 0 | = 30 | 2 | (2, 3, 4), (3, 4, 5) |
| 10 | 0 0 0 1 1 1 1 1 | = 31 | 4 | (1, 2, 3), (1, 2, 4), (1, 3, 5), (1, 4, 5) |
| 11 | 0 0 1 0 0 1 1 0 | = 38 | 1 | (2, 3, 6) |
| 12 | 0 0 1 0 0 1 1 1 | = 39 | 2 | (1, 2, 3), (2, 3, 6) |
| 13 | 0 0 1 0 1 0 1 0 | = 42 | 1 | (2, 4, 6) |
| 14 | 0 0 1 0 1 0 1 1 | = 43 | 2 | (1, 2, 4), (2, 4, 6) |
| 15 | 0 0 1 0 1 1 0 1 | = 45 | 2 | (1, 3, 4), (3, 4, 6) |
| 16 | 0 0 1 0 1 1 1 0 | = 46 | 2 | (2, 3, 4), (3, 4, 6) |
| 17 | 0 0 1 0 1 1 1 1 | = 47 | 4 | (1, 2, 3), (1, 2, 4), (2, 4, 6), (2, 3, 6) |
| 18 | 0 0 1 1 0 0 1 1 | = 51 | 2 | (1, 2, 5) (2, 5, 6) |
| 19 | 0 0 1 1 0 1 0 0 | = 52 | 1 | (3, 5, 6) |
| 20 | 0 0 1 1 0 1 0 1 | = 53 | 2 | (1, 3, 5), (3, 5, 6) |
| 21 | 0 0 1 1 0 1 1 0 | = 54 | 2 | (2, 3, 5), (3, 5, 6) |
| 22 | 0 0 1 1 0 1 1 1 | = 55 | 4 | (1, 2, 3), (1, 3, 5), (2, 3, 6), (3, 5, 6) |
| 23 | 0 0 1 1 1 0 0 0 | = 56 | 1 | (4, 5, 6) |
| 24 | 0 0 1 1 1 0 0 1 | = 57 | 2 | (1, 4, 5), (4, 5, 6) |
| 25 | 0 0 1 1 1 0 1 0 | = 58 | 2 | (2, 4, 6), (4, 5, 6) |
| 26 | 0 0 1 1 1 0 1 1 | = 59 | 4 | (1, 2, 4), (1, 4, 5), (2, 4, 6), (4, 5, 6) |
| 27 | 0 0 1 1 1 1 0 0 | = 60 | 2 | (3, 4, 5), (3, 4, 6) |
| 28 | 0 0 1 1 1 1 0 1 | = 61 | 4 | (1, 3, 5), (1, 4, 5), (3, 4, 5), (3, 4, 6) |
| 29 | 0 0 1 1 1 1 1 0 | = 62 | 4 | (2, 3, 5), (2, 3, 6), (3, 5, 6), (4, 5, 6) |
| 30 | 0 0 1 1 1 1 1 1 | = 63 | 8 | (1, 2, 3), (1, 2, 4), (1, 3, 5), (1, 4, 5), (2, 3, 6), (2, 4, 6), (3, 5, 6), (4, 5, 6) |

*FOR THE INDICES NOT LISTED, NO VALID ISOFACETS CAN BE GENERATED.

FIG. 7

|WD 0: 4.0e+04Hz| 0.0e+00sec|(0.0e+00, 0.0e+00, 0.0e+00)X|Cut 0.0e+00|EL 0|U|

| EDGES | | SCALAR VALUES AT VERTICES | |
|---|---|---|---|
| e1 = (44,60) | e4 = (60,63) | val (44) = 33.0 | val (63) = 42.5 |
| e2 = (44,63) | e5 = (60,64) | val (60) = 41.0 | val (64) = 43.0 |
| e3 = (44,64) | e6 = (63,64) | | |

METHODS AND APPARATUS FOR EFFICIENTLY GENERATING ISOSURFACES AND FOR DISPLAYING ISOSURFACES AND SURFACE CONTOUR LINE IMAGE DATA

This is a continuation of application Ser. No. 07/844,805 filed on Mar. 2, 1992, now abandoned.

BACKGROUND OF THE INVENTION

1. Field of the Invention

The invention relates generally to methods and apparatus for generating and displaying isosurfaces. In particular, the invention relates to methods and apparatus for generating isosurfaces given input data that includes (1) the representation of a set of points in three-dimensional space; (2) connectivity information with respect to the set of points, i.e., information concerning how to form a geometric shape utilizing the given set of points; and (3) a scalar field, i.e., a single scalar value associated with each point in said set of points such as, for example, temperature, etc., for the purpose of volumetric data visualization.

The methods and apparatus contemplated by the invention allow the desired isosurfaces to be produced efficiently on all hardware platforms including those not equipped to rapidly generate such isosurfaces using normally computation intensive processes. Further aspects of the invention are directed to (1) methods and apparatus which support the selective display of isosurface and contour line images, and to (2) methods and apparatus which utilize parallel processing techniques to enhance the efficiency of isosurface "image data" generation, where the term "image data" as used herein is defined as a data structure that may be utilized by, for example, a commercially available graphics package to actually produce the display image.

2. Description of the Related Art

The following additional definitions will be used herein in connection with describing the background of the invention and the invention per se:

(1) An "isosurface" is defined as a surface in three-dimensional space on which all scalar field values are constant (i.e., are equal).

(2) A "scalar field" is defined as a set of scalar values (each value being a single real number), each associated with a point in three-dimensional space.

(3) A "contour line" is defined as a curve in three-dimensional space on which all scalar field values are constant (i.e., are equal).

(4) A "triangle" is defined as a region conformally mapable into a plane bounded by three edges with common vertices.

(5) A "tetrahedron" is defined as a volumetric region bounded by four triangular patches with common edges.

(6) An "isolevel" is defined as the scalar value associated with either an isosurface or a contour line.

(7) An "isofacet" is defined as a bounded subdivision of an isosurface.

In performing scientific and engineering analysis, it is often desirable to examine a scalar field mapped over a discretized volume, referred to in the field of finite element analysis as a "mesh".

Such scalar fields may represent stress values within a mechanical object, pressure or temperature of a fluid flow, or other physical phenomena occurring within (or on the boundary of) a volumetric region.

To visualize results interactively utilizing a digital computer, having an associated storage device and interactive display facilities, it is highly desirable to present users with isosurfaces of constant scalar value in order to visualize the behavior of measurable physical phenomena in three-dimensional space.

Means for computing isosurface image data, which can then be used to produce a display utilizing commercially available graphics packages, are known in the prior art and are referred to herein as "isosurface generators" In general, the full shape of an isosurface cannot be expressed in closed form; therefore, the known isosurface generators utilize approximations to generate the isosurface image data utilized to actually render an isosurface image.

Several well known approximation methods exist, including those that globally fit high-order curved surfaces to input geometric and scalar field data as taught, for example, by Lancaster and Salkauskas, in "Curve and Surface Fitting: An Introduction", published in 1986 by Academic Press. However, global surface-fitting is often a computationally intensive process and to perform such processes, specialized, expensive, processing hardware would be required.

Alternate approaches for generating isosurfaces are known, i.e., approaches that do not rely on global surface fitting, as typified by the use of the polyhedra approximation techniques taught in an article by Koide, Doi and Kajioka entitled "Polyhedral Approximation Approach To Molecular Orbital Graphics", published in the Journal of Molecular Graphics 4 (1986), at pages 149–160. This publication is hereby incorporated by reference.

Koide et al, teaches an isosurface generator that performs the following steps to create isosurface image data:

(a) decomposing the mesh into tetrahedra;

(b) identifying the isofacet vertices on the edges of each tetrahedral subelement; and (c) connecting the vertices together as triplets to form triangular isofacets.

For the final step, Koide et al specify that the connection of the vertices and the number of isofacets produced within the tetrahedron are specified based only upon the presence of vertices on tetrahedron edges.

Utilizing such teaching, additional processing would then be required to determine the specific edges containing the vertices to be connected. This additional processing is largely repetitive, resulting once again in the isosurface generation being computationally intensive, very time-consuming and therefore slow in response.

In contrast to the teachings of Koide et al, prior art isosurface generators, such as the one taught by Koyamada in Japanese published patent application 3-127188 entitled "Method and Apparatus For Generating Images", are known which do not use intermediate geometric data (in particular, Koide et al's triangles) to represent isosurfaces and which can produce isosurface image data without having input connectivity information. In particular, Japanese published patent application 3-127188 utilizes the property that all isosurfaces within a tetrahedron have the same normal vector, and the fact that scalar values change linearly along any segment, to generate isosurface image data.

Such approaches to isosurface image data generation are problematic in that the resultant image data can not be used to dynamically reposition isosurface images, nor can the image data be used to display surface contour lines since no connectivity information and surface geometry are defined.

Prior art specifically directed to displaying isosurface image data (as opposed to generating such data) is also known and referred to herein as further background material to illustrate the state of the art. For example, Japanese published patent application 3-202981 entitled "Method and System for 3D Graphics", teaches methods for displaying isosurface image data that enable a user to get a quick response for displaying isosurfaces with hidden surfaces processed from a 3D grid data without special graphic hardware.

Other prior art teachings, such as the teachings by Behm et al found in U.S. Pat. No. 5,150,457, assigned to the same assignee as the present invention (entitled "Enhanced Visualization Using Translucent Contour Surfaces"), and the aforementioned Japanese published patent application 3-127188 reference, also relate to methods and apparatus useful for displaying isosurface image data.

None of the known prior art methods and apparatus used for displaying isosurface image data are suitable for selectively display isosurfaces and surface contour lines occurring at user-selected isolevels where the isolevels are chosen from a set of predefined scalar values. Such a capability would provide for an enhanced degree of user interactivity and permit more detailed analysis of phenomena represented by the isosurface images.

Finally, Koyamada in an article entitled "A Method To Reconstruct Solid Elements Into Linear Tetrahedral Elements", published in IBM Technical Disclosure Bulletin, Vol. 32, No. 1, June 1989, pp. 340-2, sets forth further background material useful in understanding the present invention. In this reference Koyamada describes the general concept of creating display data from three-dimensional finite analysis output by first creating a "tetraset", i.e., by converting all elements which a three-dimensional region consists of, into linear tetrahedral elements. It will be seen hereinafter that the present invention makes use of this concept for generating isosurface image data.

In view of the prior art described hereinabove, and indeed in view of the present state of the art, it would be desirable to provide methods and apparatus which allow the aforementioned visualization of isosurfaces to be performed on less sophisticated hardware platforms than taught in the prior art, e.g., those isosurfaces generators which globally fit high-order curved surfaces to input geometric and scalar field data.

Furthermore, it would be desirable if such methods and apparatus facilitated a high degree of interactivity between the user and system utilized to display isosurface image data. For example, it would be desirable if the selective display of isosurfaces and surface contour lines were supported, along with the ability to selectively display isosurfaces and surface contour lines occurring at user-selected isolevels, where the isolevels are chosen from a set of predefined scalar values. It would also be desirable to provide the user with the ability to interactively reposition a displayed image.

Still further, it would be desirable to provide methods and apparatus for generating isosurface image data that could take advantage of present day parallel processing techniques to improve the efficiency of the image data generation process, and to improve overall system responsiveness to user requests (for example, to aid in repositioning an image being displayed), etc.

SUMMARY OF THE INVENTION

Accordingly, it is an object of the invention to provide methods and apparatus which enable isosurface image data to be generated on less sophisticated hardware platforms than those that would be required to globally fit high-order curved surfaces to input geometric and scalar field data.

It is a further object of the invention to provide methods and apparatus which facilitate a high degree of interactivity between the user and system utilized to display isosurface image data.

Furthermore, it is an object of the invention to provide methods and apparatus which allow a user to selectively display isosurfaces and surface contour lines from isosurface image data and, in particular, to allow a user to selectively display isosurfaces and surface contour lines occurring at user-selected isolevels, where the isolevels are chosen from a set of predefined scalar values.

Further yet, it is an object of the invention to provide methods and apparatus for generating isosurface image data which can take advantage of present day parallel processing techniques to improve the efficiency of the image data generation process, and to improve overall system responsiveness to user requests.

To accomplish visualization of isosurface image data, with high interactivity, on less sophisticated hardware platforms (less sophisticated than those platforms required to perform global surface fitting and the other isosurface generation techniques referred to hereinabove), the invention contemplates methods and apparatus which efficiently perform a polyhedra approximation process that piecewise fits input data (data input to the novel isosurface generator), with surface patches. The surface patches can be planar or can be of a higher order as demanded by the application and as allowed by the platform.

When the scalar field data are known only at discrete points in the mesh, the methods and apparatus contemplated by the invention provide information about the isosurfaces similar to that provided by utilizing global surface fitting techniques; but allow for the desired high degree of interactivity on less capable hardware platforms than those that would otherwise be required utilizing prior art isosurface generation techniques.

According to one aspect of the invention, the novel methods and apparatus being disclosed herein generate an isosurface in the form of a contiguously connected collection of isofacets. The highest resolution, according to a preferred embodiment of the invention, is provided when the isofacets have no more than three edges (a triangular approach, like the one described in the aforementioned incorporated Koide et al reference). Therefore, each isofacet is outlined by a sequence of three vertices at which the scalar field assumes the same value as the other values in the collection.

According to another aspect of the invention the disclosed isosurface generation process (and apparatus for implementing the process) introduces the application of tetrahedron component labeling into the isofacet computation process taught in the incorporated Koide et al reference.

The labeling allows for the novel use of one time precomputed models of the isofacet configurations corresponding to all possible combinations of vertices on tetrahedron edges. Such a precomputed classification scheme eliminates costly repetitive processing performed for each tetrahedron in the subdivided mesh, and this leads to a very fast, interactive isosurface visualization scheme. Quantitative illustrations deriving order-of-magnitude speedup factors are set forth hereinafter in connection with the detailed description of the invention.

According to a specific preferred embodiment of the invention, a method is set forth for generating isosurfaces utilizing a digital computer and associated storage means, wherein (1) a given geometric volume represented by a set of points in three-dimensional space together with connectivity data defining a set of volume elements which subdivide said geometric volume and (2) a scalar field associated with said set of points, having a single scalar value associated with each point in said set of points, is stored in said storage means, comprising the steps of: (a) subdividing each volume element into a tetraset in such a way that the triangular faces of the tetrahedral subelements that are subdivisions of a face of a given volume element align with the faces of the tetrahedral subelements of the neighboring volume element sharing the face of the given volume element; (b) subdividing the range of said scalar field into a predefined number of equally spaced value-steps forming a value-step sequence; (c) identifying, for each volume element and for each member of the tetraset associated with a given volume element, which, if any, value-steps are contained within each tetraset member; and (d) generating a set of isofacets for each value-step identified in step (c).

According to further aspects of the invention, the aforementioned step of identifying (step (c)), is performed utilizing predefined tetrahedron component labeling data stored in the aforesaid storage means, and the aforementioned step of generating (step (d)), is performed utilizing a predefined isofacet configuration table stored in said storage means.

Still further aspects of the invention are directed to methods and apparatus which (1) provide the desired selective isosurface and surface contour line display capabilities, (2) provide the ability to reposition isosurface images, and (3) provide isosurface image data in the form of data structures that can be efficiently processed utilizing parallel processing techniques.

The invention features the use of a precomputed isofacet configuration table and the use of predefined tetrahedron component labeling data (preset relationships among the vertices, edges and faces of a tetrahedron), to enhance the efficiency of the methods and apparatus used to generate isosurface image data.

Furthermore, the invention features methods and apparatus that are well suited to take advantage of parallel processing techniques since the individual tetrahedra in the tetrasets into which volume elements are subdivided (as indicated hereinabove), can be assigned to independent processors.

Still further features of the invention include the ability of a system user to enjoy a high degree of interactivity with the display created utilizing isosurface image data generated by the invention, In particular the invention features the ability to permit user selection of specific isosurfaces and surface contour lines for display from the generated isosurface image data.

These and other objects and features of the present invention and the manner of obtaining them will become apparent to those skilled in the art, and the invention itself will be best understood by reference to the following detailed description read in conjunction with the accompanying Drawing.

BRIEF DESCRIPTION OF THE DRAWING

FIG. 1 is a flowchart representing the isosurface processing flow contemplated by the invention.

FIG. 2 depicts scalar isosurfaces intersecting the skin of an object.

FIG. 4 depicts, in tabular form, a set of exemplary scalar values associated with the nodes of the mesh depicted in FIG. 3.

FIG. 7 depicts a predefined isofacet configuration table that, in accordance with the teachings of the invention, is precomputed and stored as a second data set accessible to the isofacet generator contemplated by the invention. In particular, the depicted table contains data pertaining to the valid isofacets that can be generated for the tetraheadral elements used, in accordance with the teachings of the invention, to subdivide geometric volumes in the isosurface generation process.

DETAILED DESCRIPTION

The invention will be described both in general terms and with specific reference to an illustrative example. Furthermore, the invention will be described, for the sake of illustration only, in the context of a general purpose, programmable, digital computing system that includes (or has associated with it), (1) a display system that permits the visualization of an interaction with display image data and (2) memory for storing image data, generated by the isosurface generator contemplated by the invention, and for storing image data manipulated (for example, repositioned) as a result of user interaction.

The various aspects of the invention, for example, the novel isosurface generator itself, the techniques for selecting portions of isosurface image data for display purposes, etc., are described hereinafter in terms of the detailed processes to be performed to achieve the various objects of the invention, the data structures used in performing these processes (for example, certain predefined data sets), and required process inputs which include (1) the representation of a set of points in three-dimensional space; (2) connectivity information with respect to the set of points, i.e., information concerning how to form a geometric shape utilizing the given set of points; and (3) a scalar field, i.e., a single scalar value associated with each point in said set of points such as, for example, temperature, etc., for the purpose of volumetric data visualization.

Those skilled in the art will readily appreciate that one embodiment of the invention, indeed a preferred embodiment, may be realized by utilizing the aforementioned digital computer to execute a "program" (some combination of hardware and software, including executable code and data), or programs, that perform the novel processes described hereinafter, utilizing the inputs and data structures described hereinafter as well. Once given the desired process steps, data structures, etc., it is well within the ability of those skilled in the art of programming digital computers to, for example, fabricate, as a program, the isosurface generator and the other specific aspects of the invention contemplated herein.

Figure 1:
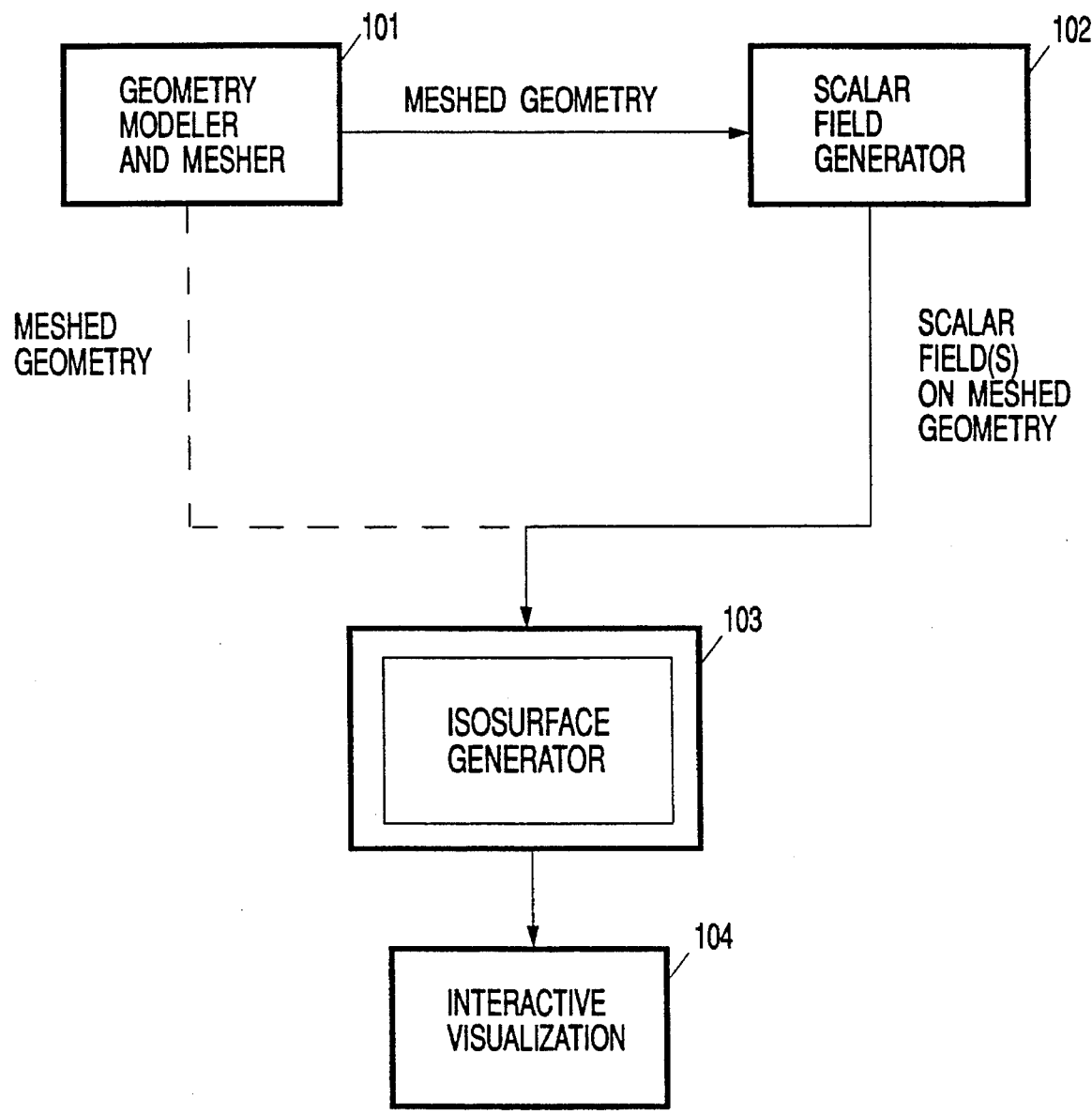
FIG. 1 illustrates where the methods and apparatus for performing iosurface generation fit into a general Computer Aided Design (CAD) environment. In particular

Reference should now be made to FIG. 1 which illustrates where the methods and apparatus for performing isosurface generation fit into a general Computer Aided Design (CAD) environment.

FIG. 1 is a flowchart representing the isosurface processing flow contemplated by the invention showing (a) the inputs required by the isosurface contemplated by the invention as being provided by prior art Geometric Modeler and Mesher 101 and prior art Scalar Field Generator 102; (b) isosurface generator 103, the isosurface generator contemplated by the invention, for generating isosurface image data utilizing the process steps to be described hereinafter; and (c) the outputs of isosurface generator 103 (isosurface image data), being made available for interactive visualization, shown at block 104 of FIG. 1, which may be accomplished, for example, utilizing a commercially available display device driven by a commercially available graphics package.

Figure 2:
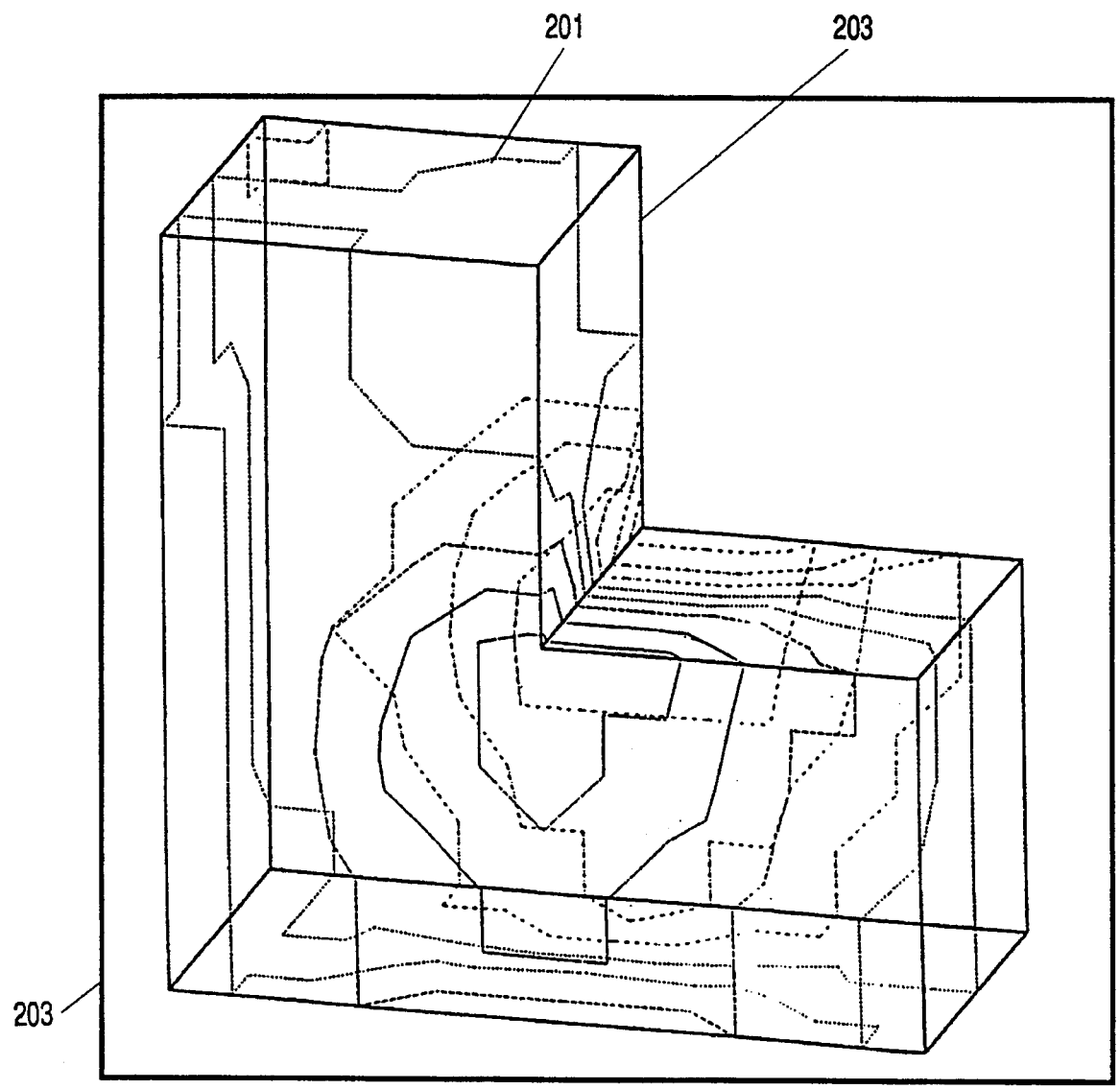
FIG. 2 illustrates how isosurfaces can be utilized to visualize the stress contours on the boundary of an object. In particular.

An example of a display that may be created utilizing isosurface image data is depicted in FIG. 2. FIG. 2 generally illustrates how isosurfaces can be utilized to visualize the stress contours, such as contour 201, on the boundary of an object, such as object 202. In particular, FIG. 2 depicts scalar isosurfaces intersecting the skin of an object 202, all shown on the screen of a display, such as display screen 203.

It should be noted at this point that the data structure output by isosurface generator 103, in accordance with one of the teachings of the invention, will be suitable for allowing a user to select isosurfaces and surface contour lines for display (utilizing the interactive visualization equipment located at block 104), as will be described in greater detail hereinafter.

Each portion of the isosurface processing flow depicted in FIG. 1, will now be described in greater detail hereinafter with reference to a specific example involving the cube depicted in FIG. 3.

To begin with, the required inputs to isosurface generator 103, as indicated hereinbefore, consist of (1) the representation of a set of points in three-dimensional space; and (2) connectivity information with respect to the set of points, i.e., information concerning how to form a geometric shape utilizing the given set of points (collectively referred to as the "mesh" provided by Geometric Modeler and Mesher 101); and (3) a scalar field, provided by Scalar Field Generator 102.

The aforementioned mesh may be represented by a collection of volume elements. Each volume element may be represented by a collection of faces, each in turn represented by a sequence of node identifiers that reference coordinate locations. The faces can be planar or can be patches of prespecified curved surfaces. A record of the faces that bound only one volume element (i.e. external faces) is also assumed to be provided (to isosurface generator 103) with the mesh produced by Geometric Modeler and Mesher 101.

Figure 3:
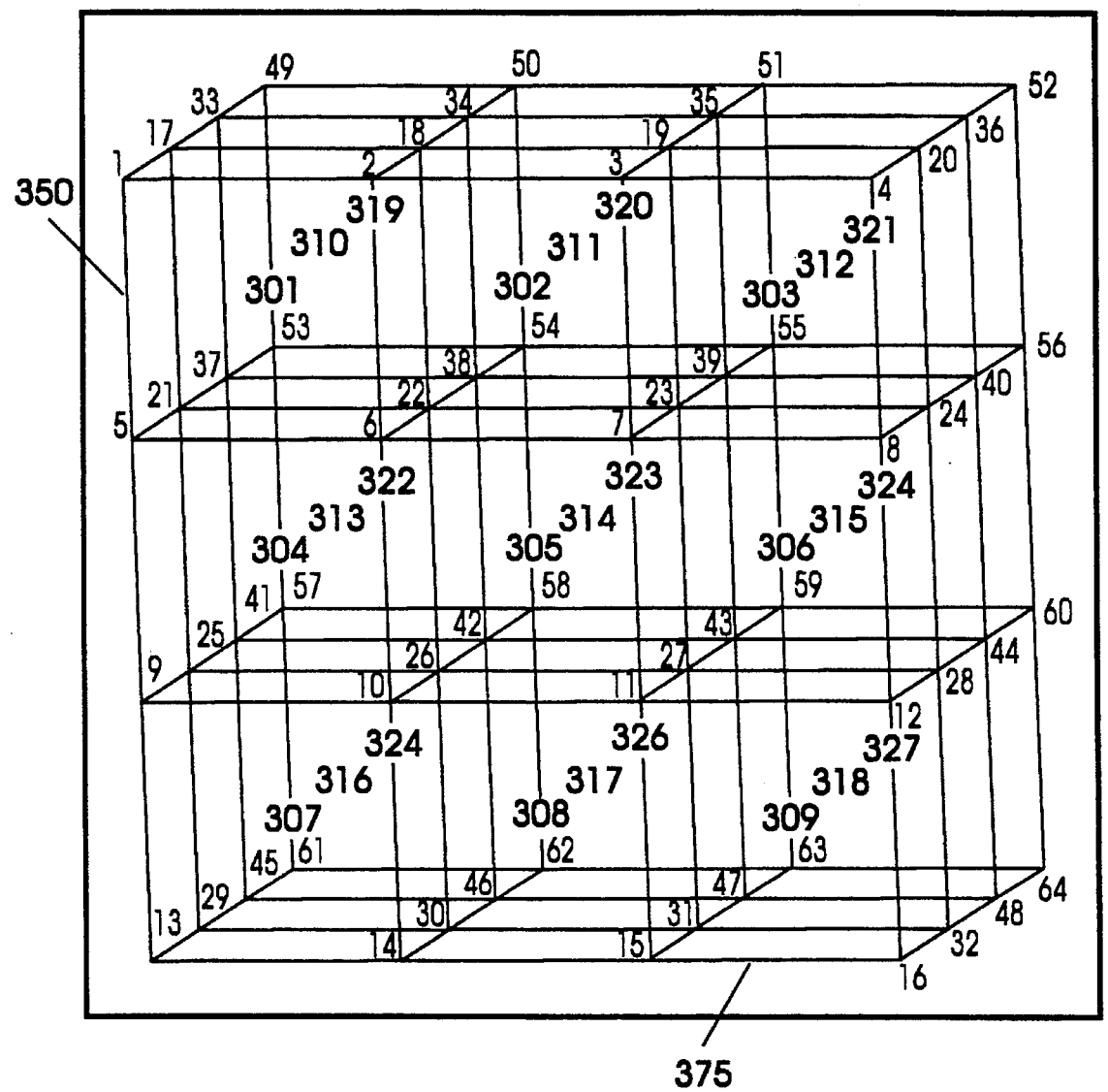
FIG. 3 depicts a cube that is shown decomposed into a mesh consisting of a collection of 27 hexahedral volume elements.

Referring now to FIG. 3, an exemplary cube, 350, which will be used to illustrate the principals of the invention, is shown (within a display screen 375), decomposed into a mesh consisting of a collection of 27 hexahedral volume elements. This mesh is composed of 27 hexahedral ("brick") volume elements, each built from 6 planar quadrilateral faces, in turn built from combinations of 8 of the 64 mesh nodes. The 64 nodes depicted in FIG. 3 are labeled as nodes 1–64 and volume elements are labeled as volume elements 301–327.

The aforementioned scalar field, provided by scalar field generator 102, may be represented by discrete values known at the nodes of the mesh. In accordance with the illustrative embodiment of the invention being presented with reference to the cube depicted in FIG. 3, the scalar field values assigned by Scalar Filed Generator 102 are shown in tabular fashion (each nodes 1–64 having an assigned scalar value) in FIG. 4.

Given the exemplary inputs described hereinabove, what follows is a detailed description of the steps to be performed by novel isosurface generator 103 to determine the isosurfaces and generate the appropriate isosurface image data.

First, according to the illustrative embodiment of the invention, each volume element is subdivided into a tetraset, which, as indicated hereinbefore, is a set of tetrahedral building blocks fitting together to form the volume element.

In accordance with the teachings of the invention, the subdivision is to be performed in such a way that the triangular faces of the tetrahedral subelements that are subdivisions of a face of a given volume element align with the faces of the tetrahedral subelements of the neighboring volume element sharing the volume element face.

This property of the subdivision is guaranteed, by definition, when the volume element is a tetrahedron. In cases of volume elements with more faces, when subdivisions could be misaligned with neighboring volume elements, the property is enforced through the use of what will be referred to hereinafter as a "forest fire algorithm". Although such algorithms are well known and used in other applications, this technique for enforcing subdivision alignment will be reviewed herein for the sake of completeness.

According to the forest fire algorithm that is contemplated for use with the invention, a seed volume element is chosen as the first volume element in a queue, and the subdivision is performed at an arbitrary orientation since no neighbor has yet been subdivided. Next, a flag is set indicating that the seed has been visited, and all its neighbors are placed in the queue, thereby starting a "forest fire".

The next volume element (at this point, one of the neighbors of the seed) in the queue is examined. By construction of the queue, this next volume element is guaranteed to neighbor at least one visited volume element. The orientation of its subdivision is then performed to be compatible with all visited neighbors. The orientation chosen is guaranteed to be compatible with any other of the visited neighbors because such visited neighbors are, directly or indirectly, compatible with the original seed orientation.

This queuing/dequeuing process is continued until the queue is empty. At that point, either the entire object, or an isolated subdomain, has been subdivided. The object is then researched for any unvisited volume elements. If any are found, a new seed is established for the newly found isolated subdomain, and the queuing process is repeated for this subdomain.

The overall subdivision process halts when all volume elements have been visited. Multiple searches of the object for unvisited volume elements are only necessary for objects with disjoint components.

Figure 5:
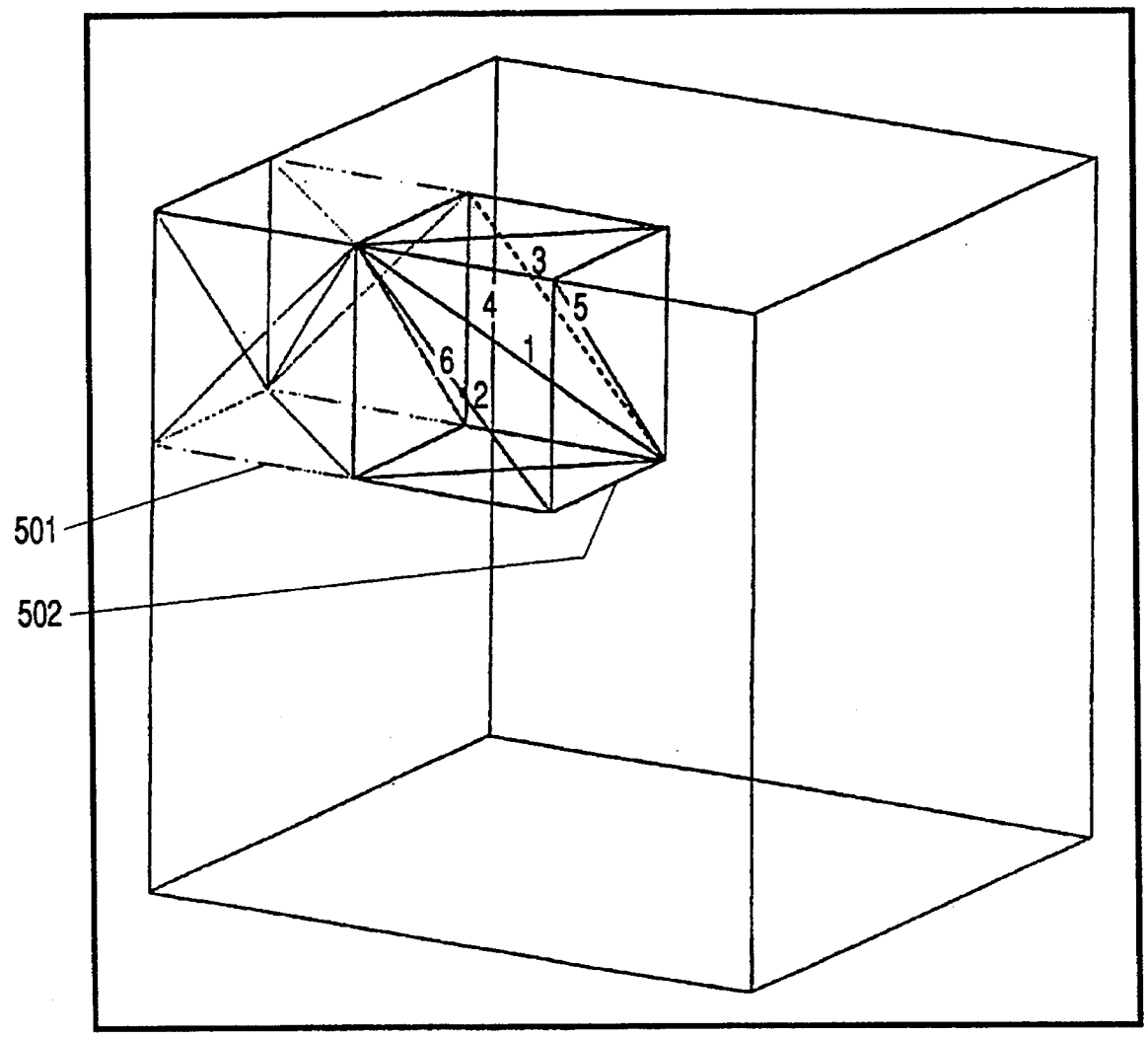
FIG. 5 depicts the tetrasets into which two of the volume elements depicted in FIG. 3 may be decomposed and further illustrates how to align neighboring tetrasets for the cube example depicted in FIG. 3 in accordance with the teachings of the invention.

Returning to the exemplary cube depicted in FIG. 3, reference should now be made to FIG. 5 which depicts the tetrasets into which two of the volume elements depicted in FIG. 3 may be decomposed. FIG. 5 further illustrates how to align neighboring tetrasets for the cube example depicted in FIG. 3 in accordance with the above described alignment process.

In particular, FIG. 5 shows the tetraset of volume element 502 (corresponding to volume element 302 of FIG. 3), that neighbors seed volume element 501 (corresponding to volume element 301 of FIG. 3), being aligned with seed volume element 501. In this example, each tetraset contains six tetrahedra (shown, for example, as the tetrahedra labeled 1–6 in volume element 502). The process propagates, as would a wave front, from the region surrounding the seed (in this case, the corner region around volume element 501 of FIG. 5) until each volume element has been subdivided and aligned.

Next, according to the illustrative embodiment of the invention, the tetraset is stored as a collection of quadruples of node identifiers making up the vertices of the tetrahedral building blocks.

For the cube example being illustrated with reference to FIGS. 3 and 5, the tetrasets of volume elements 301 and 302 of FIG. 3 (volume elements 501 and 502 in FIG. 5) are preferably stored, for volume element 301, as the following six quadruples of node identifiers (where the node numbers are taken from FIG. 3): (21,22,2,18), (21,17,2,18), (21,5,2,6), (21,5,2,1), (21,22,2,6), and (21,17,2,1); and for volume element 302, as the following six quadruples of node identifiers: (2,3,23,7), (2,6,23,7), (2,18,23,19), (2,18,23,22), (2,3,23,19) and (2,6,23,22).

Finally, as part of the first process step of subdividing each volume element into a tetraset and in accordance with the teachings of the invention, for each tetrahedron of each tetraset, flags are set indicating whether or not the triangular faces of the tetrahedra coincide with the surface boundary of the entire volume. In making this determination, the triangular faces that are classified as being boundary-coincident are those that are known, by construction, to coincide with external volume element faces (provided as part of the input mesh description). When setting the flags, the triangular faces are cataloged as depicted in FIG. 6.

Figure 6:
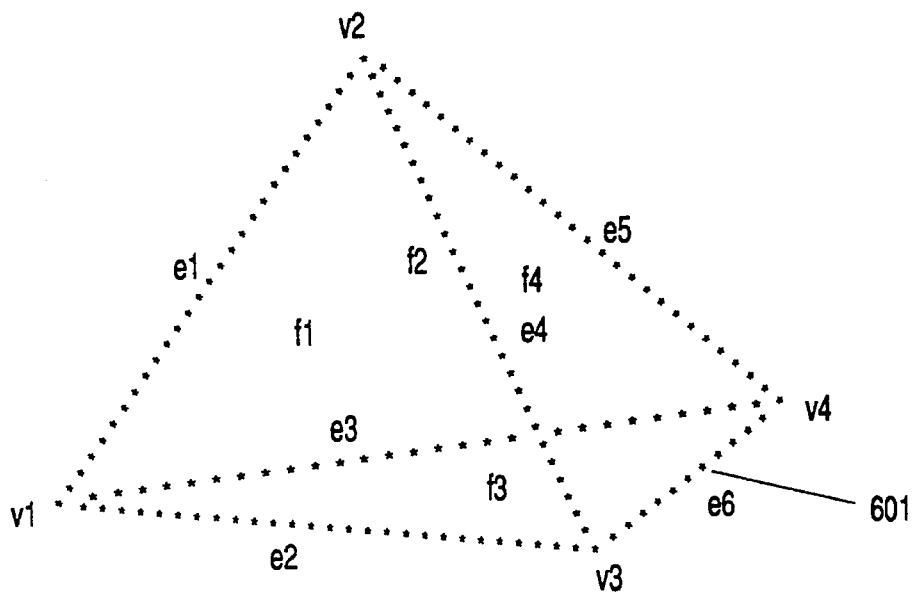
FIG. 6 depicts the specific type of predefined tetrahedron component labeling data that, in accordance with the teachings of the invention, may be hard coded and be stored as a first data set accessible to the isofacet generator contemplated by the invention.

FIG. 6 depicts the specific type of predefined tetrahedron component labeling data that, in accordance with the teachings of the invention, may be hard coded and be stored as a first data set accessible to the isofacet generator contemplated by the invention.

Specifically, FIG. 6 shows the edge, face and vertice labeling convention used in practicing the illustrative embodiment of the invention. The four vertices of exemplary tetrahedron 601 shown in FIG. 6, are labeled v1–v4, as shown in table 602 of FIG. 6; the six edges of tetrahedron 601 are labeled e1–e6, as shown in table 603 of FIG. 6; and the four faces of tetrahedron 601 are labeled f1–f4, as shown in table 604 of FIG. 6. The precomputed mappings from tetrahedral edges to vertices (e.g., e1=(v1,v2)), faces to edges (e.g., f3=(v1,v3,v4)), and edges to faces (e.g., f3=(e2, e3,e6)), are all indicated in tables 602–604 of FIG. 6.

The tetrahedron component labeling data (labeling convention) stored in the aforementioned first data set is, according to one embodiment of the invention, later reapplied when determining whether or not isosurface vertices coincide with the object boundary.

For example, making reference to FIG. 5 and the above described set of six quadruples representing the tetrahedra in volume element 501 (corresponding to volume element 301 in FIG. 3), one can see that the forth tetrahedron is represented by quadruple (21,5,2,1). The above described classification process would determine face f4=(5,2,1) by applying the labeling convention data in table 604 to the vertices in quadruple (21,5,2,1). The process would also flag face f4 of tetrahedron number 4, in volume element 301, as being coincident with the object boundary since face f4 is coincident with a volume element face (of volume element 301), that is itself coincident with the object boundary. The fourth of the four boundary coincidence flags for this particular tetrahedron would therefore be set positive. The settings for the other such flags for all the tetrasets would be determined similarly.

According to the invention, the volume element may be divided into as many tetrahedra as desired, as long as their faces that coincide with the volume element faces align with each neighboring volume element's counterparts.

The second process step to be performed by the isosurface generator contemplated by the invention is to take the value range of the input scalar field and subdivided it into a prespecified (for example, user specified) number of equally-spaced "value-steps".

In the illustrative example being set forth herein, assume that a spectrum of 85 colors is being used to span the value range from the lowest value as shown in FIG. 4 (1.0) to the highest value (43.0). In order to conveniently illustrate this aspect of the invention, the density of value-steps will be reduced by a factor of 10. Utilizing these assumptions, one can see that the increment between value-steps is (43–1.0)/ (85/10)=4.941176. This means that the isosurfaces generated will represent the following nine scalar value levels: 1.0+0×4.941176, 1.0+1×4.941176, 1.0+2×4.941176, . . . , 1.0+8×4.941176.

The final process step contemplated by the invention involves each volume element being processed to determine the isofacets contained within the volume element. The aforementioned precomputed mappings from tetrahedral edges to vertices, faces to edges, and edges to faces using the model shown in FIG. 6, are applied to each tetrahedron processed in this step.

The aforementioned final process step, to be implemented by the isosurface generator 103, will now be described in detail with reference to the illustrative cube depicted in FIG. 3, FIGS. 6–9.

For each tetrahedron in the tetraset of the volume element:

1. The 6 edges of the tetrahedron are cross-referenced to its vertices using the aforementioned first data set containing the labeling data represented on the model shown in FIG. 6. For the cube example depicted in FIG. 3, the first tetrahedron in the tetraset for volume element 327, its edges are identified as written on the bottom of FIG. 8, namely e1=(44,60); e2=(44,63); e3=(44,64); e4=(60,63); e5=(60,64); and e6=(63,64), where, as indicated hereinbefore, FIG. 8 depicts two valid isofacets located within one of the tetrahedron in the illustrative cube being used to explain the principals of the invention.

2. Each edge is examined to determine the turn points that are found along its length. A "turnpoint" is defined herein as a coordinate location at which the scalar field can be evaluated as one of the predetermined value-steps. The turn points are used as vertices of the isofacets. Interpolation between the scalar values at the edge endpoints is applied to determine all turn points on the edge. The type of interpolation, linear or otherwise, is determined by the application.

(a) As each turnpoint is found, its description is placed into a data structure referred to hereinafter as a turnpoint catalog. Each turnpoint description includes:
   i. the location, expressed as a fraction t of the edge's length from the starting edge endpoint.
   ii. the value-step s found at the location t.

Figure 8:
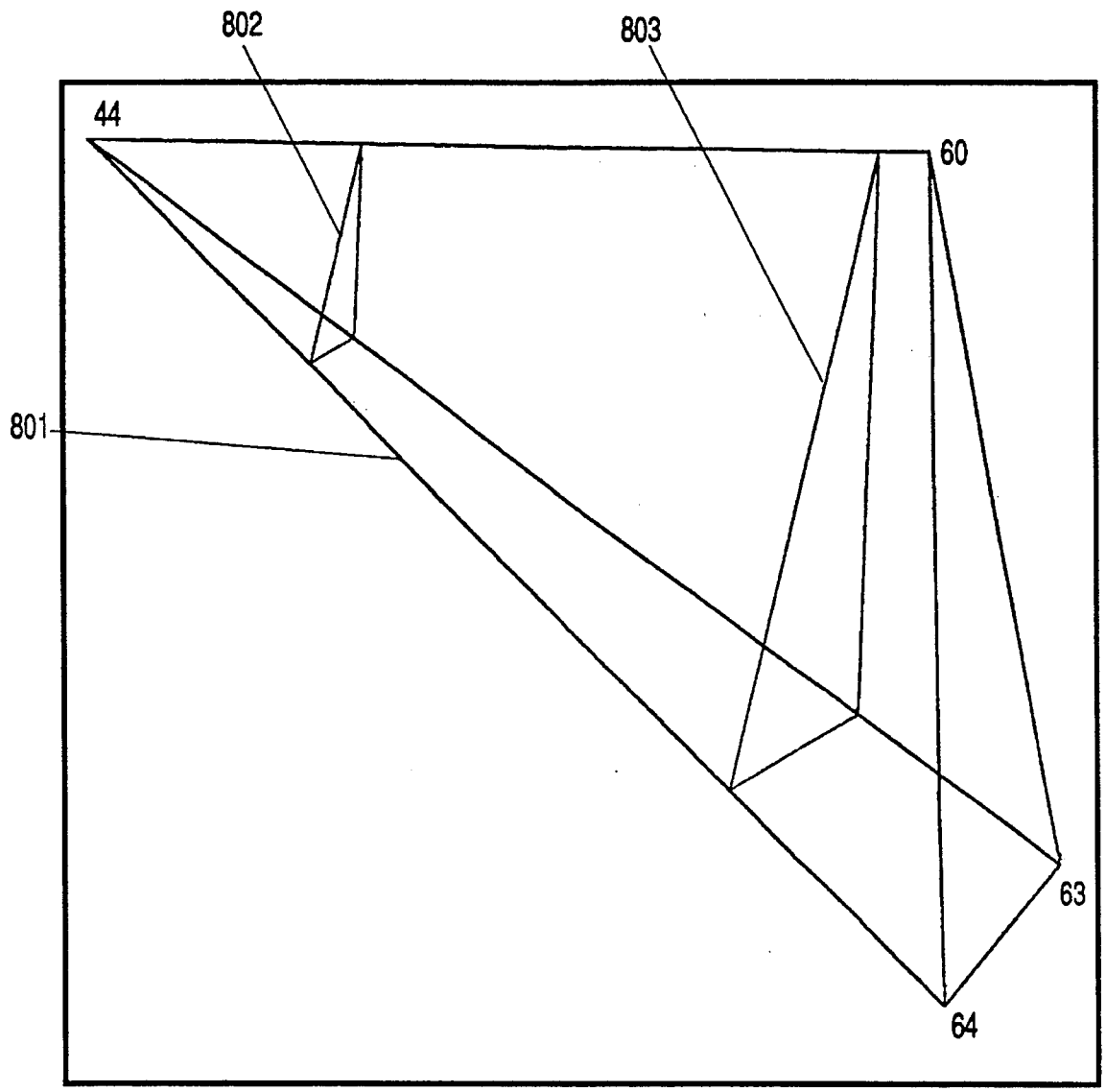
FIG. 8 depicts two valid isofacets located within one of the tetrahedron in the illustrative cube being used to explain the principals of the invention.

In the context of the illustrative example being used to explain the principals of the invention, one should note from the bottom of FIG. 8 that the last two of the predetermined value-steps $s_7 = 1.0 + 7 \times 4.941176 = 35.588234$, and $s_8 = 1.0 + 8 \times 4.941176 = 40.529411$ are between the values at the vertices of edges: e1, e2 and e3. Therefore, the turn points, t(edge, value), are placed on these edges as follows:

$t(e1,s7) = (35.588234 - 33.0)/(41.0 - 33.0) = 0.323529$ $t(e1,s8) = (40.529411 - 33.0)/(41.0 - 33.0) = 0.941176$ $t(e2,s7) = (35.588234 - 33.0)/(42.5 - 33.0) = 0.272446$ $t(e3,s7) = (40.529411 - 33.0)/(42.5 - 33.0) = 0.792570$ $t(e3,s7) = (35.588234 - 33.0)/(43.0 - 33.0) = 0.258823$ $t(e3,s8) = (40.529411 - 33.0)/(43.0 - 33.0) = 0.752941$

The turn points in the catalog are later referenced as vertices for the isofacets.

(b) The turnpoint entry in the catalog and the label of the edge containing the turnpoint are cross-referenced with the turnpoint's value-step. These cross-references are used in the next step to assemble the isofacets.

For the tetrahedron in FIG. 8 from the cube example, the turn points t(e1,s7), t(e2,s7), and t(e3,s7) (along with edges e1, e2 and e3) are cross-referenced with the value-step s7, and t(e1,s8), t(e2,s8), and t(e3,s8) (along with edges e1, e2, and e3) are cross-referenced with the value-step s8.

3. For each value-step found during the above turnpoint determination, the isofacets of the isosurface corresponding to the value-step are assembled:

(a) The list of tetrahedron edges containing the turn points of the value-step is encoded as an index into a table of precomputed models of all possible facet configurations which is stored in a second data set. This table, shown in FIG. 7 as table 701, is independent of the input data, and may therefore be established prior to the generation of isosurfaces.

As shown in the table depicted in FIG. 7, the encoding of "edges crossed" into a single integer index is performed using the depicted lower-order six bits, each representing one of the six tetrahedron edges. This is shown in FIG. 7 at 702. When a turnpoint of the value-step is found on a given edge, using the cross-references generated during the turnpoint determination, the bit assigned to that edge is set.

Once all the edges of the tetrahedron have been examined, and the bits appropriately set, the rest of the bits in the binary representation of the integer are cleared. The resulting integer (between 0 and 63, inclusive) is used as an index into the isofacet configuration table (as depicted, for example, at 703 in FIG. 7) of precomputed models.

The precomputed model corresponding to an index dictates the valid connectivity of the turn points to form the isofacets. Each triplet in the configuration corresponding to an index (shown in the portion of FIG. 7 labeled as 704), identifies the three edges upon which the turn points (to be connected to form an isofacet) are located. The turn points are then connected in the specified order by storing the corresponding triplets of turnpoint catalog references. All the isofacets found for this value-step are appended to the list of isofacets for the volume element being processed.

This type of table-lookup technique yields speedup factors of 10 or greater over conventional techniques.

Consider, for example, for tetrahedron 801 shown in FIG. 8, associated with the exemplary cube depicted in FIG. 3, the value-step s7. Cross-referenced with this value-step are edges e1, e2, and e3. Therefore, the resulting table index is $0 \ldots 00000111_{binary} = 7_{decimal}$. The entry, (1,2,3), at index 7 in the table (FIG. 7) specifies that the turn points on edges e1, e2, and e3 are to be connected to form the isofacet. This isofacet, embodied as references to the turn points in the triple (t(e1,s7), t(e2,s7), t(e2,s7)), is appended to the list of isofacets for the value-step s7 in volume element 327.

(b) While connecting the turnpoint references together as isofacet vertices, an indicator signifying whether or not a turnpoint coincides with the overall volumetric object boundary is appended to the description of the turnpoint in the catalog.

A turnpoint is classified to be on the boundary if and only if the edge, containing the turnpoint, bounds a tetrahedron face that was previously found to coincide with the surface boundary of the entire volume. In making this determination, precomputed matrix 605, shown in FIG. 6, is indexed by the two tetrahedron edges containing two consecutive isofacet vertices (turn points). The row/column entry in the matrix identifies the face between the edges that is then checked for coincidence with the object boundary. If the face was previously flagged during tetraset formation as coinciding with the object boundary, then the two turn points on each of the two edges are considered to also coincide with the object boundary.

The process is done for each pair of isofacet vertices. When a turnpoint that was previously identified as coinciding with the object boundary is revisited, the indicator is not allowed to be changed.

For tetrahedron 801 shown in FIG. 8, this technique can be illustrated by examining the pair of isofacet vertices t(e1,s7) and t(e3,s7). The edges to be used as indices into the matrix are therefore e1 and e3. The corresponding entry in the matrix is f2=(44,60,64), and when this tetrahedron was identified during tetraset formation, this face would have been identified as coinciding with the object exterior. Therefore, the two turn points are likewise classified.

Having described the process steps utilized by the isosurface generator contemplated by the invention, a description of the isosurface generator outputs will now be set forth.

The isosurface generator contemplated by the invention produces the augmented turnpoint catalog and the isofacet image data.

The augmented turnpoint catalog contains the turnpoint descriptions, each indexed by the segment of nodes upon which it is located. For each turnpoint, the description consists of the value-step, the location between the nodes, and the added indicator signifying coincidence with the object boundary.

Figure 9:
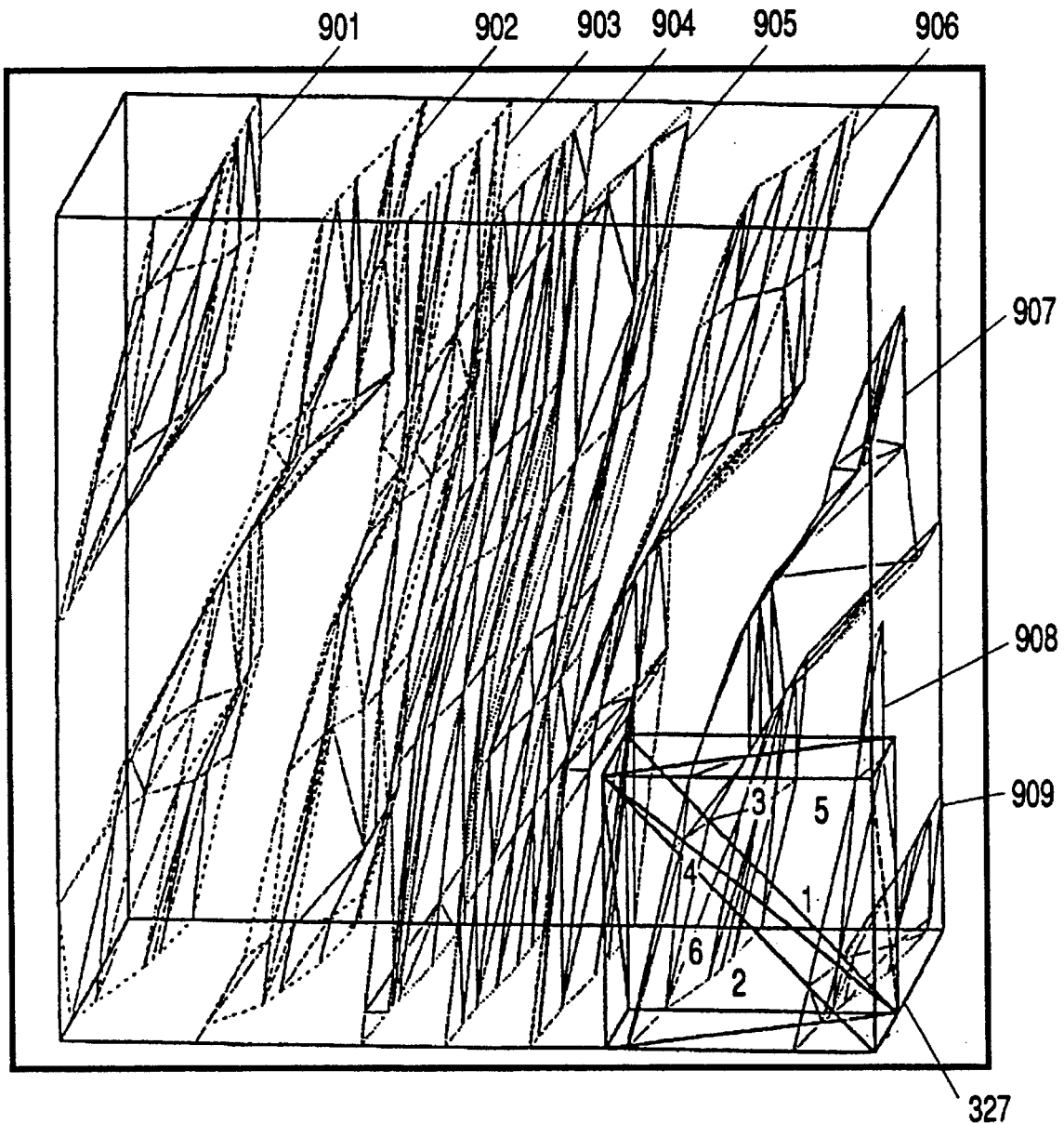
FIG. 9 depicts a set of isosurfaces occurring on the illustrative cube being used to explain the principals of the invention.

Reference should now be made to FIG. 9 which depicts a set of nine isosurfaces (shown as isosurfaces 901–909 in FIG. 9) occurring in (and on) the illustrative cube being used to explain the principals of the invention. In the lower right-hand corner of FIG. 9, volume element 327 of the cube depicted in FIG. 3 has been highlighted. The turn points in this particular region are all points where the isofacets intersect the tetraset edges. The turnpoints in the highlighted region that are flagged as being on the object boundary are those that are located on an exterior face of volume element 327.

The isofacets (isofacet image data), output by the isosurface generator, are stored on a per-volume element basis in the storage means associated with the exemplary digital computer on which the isosurface generator is implemented. For each volume element, a list of isofacets is stored. Each isofacet is represented by a triplet of direct references to entries in the turnpoint catalog. The turn points can be referenced and connected by linear segments or by segments of higher degree, as demanded by the application.

Again, referring to FIG. 9, all isofacets of the nine isosurfaces (representing the nine value-steps) are shown spanning the cube. The portions of the isosurfaces contained in volume element 327 are embodied as the six isofacets (labeled 1–6) in the tetraset shown highlighted in volume element 327 of FIG. 9.

According to one aspect of the invention, isosurfaces for all value-steps (where the value-steps form a value-step sequence) can be displayed utilizing commercially available three-dimensional graphics packages, by simply displaying the stored isofacet triangles referred to hereinabove.

According to another aspect of the invention, the stored isofacet triangles may be selectively displayed as a function of a user specified value-step subsequence (or subsequences). In accordance with this embodiment of the invention, as the isofacet triangles are being selected for display, only those possessing a value-step contained within the user specified subsequence (or subsequences), are actually displayed.

Still another aspect of the invention allows contour lines for all value-steps (where the values steps form a value-step sequence) to be displayed utilizing commercially available three-dimensional graphics packages, by displaying the isofacet edges bounded by stored vertices (turn points) flagged as being colocated with the surface of the geometric volume. As indicated hereinbefore, the way that the vertices are determined to be colocated are if they are on a face that has been flagged as being on the object boundary.

According to yet another aspect of the invention, the stored isofacet edges may be selectively displayed as a function of a user specified value-step subsequence (or subsequences). In accordance with this embodiment of the invention, as the isofacet edges colocated with the surface of the geometric volume are being selected for display, only those possessing a value-step contained within the user specified value-step subsequence (or subsequences), are displayed.

The methods and apparatus described hereinabove support the efficient generation of isosurface image data given the input geometry (points and connectivity information), and scalar field data. In effecting the efficiency of the described process, the novel technique of using a precomputed isofacet configuration table (as shown in FIG. 7), is employed. Without a model of this kind, numerically intensive geometric searches would need to be performed when assembling isofacets.

For the sake of completeness, returning to the cube example as an illustration, the novel process taught herein will be distinguished from conventional methods for generating isosurface image data, at the point in the process when the turn points on the edges have been identified.

Using the precomputed model, the edges have specific labels, e.g. e1, e2, e3, that are used to set bits in an index for the configuration table. Therefore, by using the precomputed table method in this example, only three bitwise operations and one array access (each approximately equivalent to one integer operation) are required to determine the isofacet connectivity.

Without the labeling and the table, the connectivity needs to be derived on the local level. Even for this simple case of three turn points, it is not guaranteed that they can be connected to form a valid isofacet. It is possible that, for example, the third edge could have been e4 instead of e3.

Using conventional methods to determine valid connectivity among the three turn points on the three edges, a crossed edge, for example e1, is arbitrarily selected. Then a second crossed edge, for example e2, is tested for coplanarity with e1, requiring at least 2 floating point operations. If it is found to be coplanar, then the two turn points on edges e1 and e2 are tentatively connected.

If edges e1 and e2 are not connected, then the turn points on edges e1 and e3 are tentatively connected. Then, the remaining edge is tested for either coplanarity or vertex commonality with the other two edges.

If this last test passes, then the turnpoint on the remaining edge is connected to the other two to form a valid isofacet. If not, then no valid isofacet can be formed.

Therefore, as a conservative estimate depending on the efficiency of program design, at least four floating point operations and one integer operation are required to determine the isofacet connectivity. If a single unit of processing is ascribed to integer and bitwise operations, then a floating point operation would nominally consume 10 equivalent operations, and thus it can be seen that for the above example, the configuration table method increases the speed of processing by a factor of $(4 \times 10+1)/(3+1)-10$.

Also, for the sake of completeness, it should be noted that several validity rules are built into the construction of the tabulated isofacet configurations stored in the aforementioned second data set (previously described herein with reference to FIG. 7). It can be observed that the table contains fewer than all the possible triplets for all the possible 64 entries. The table is constructed this way due to the fact that the triplets tabulated represent only and all the isofacet configurations satisfying the requirement stipulating that the edges of each isofacet must either cross a tetrahedron face of coincide with the edges of other isofacets within the configuration. This property guarantees that the groups of isofacets are contiguous in three dimensions, both within and among the tetrahedra, and that all degenerate cases with turn points on tetrahedron vertices are automatically addressed.

Returning again to the comparison between the novel isosurface image data generation process taught herein and conventional processing methods, the conventional methods become very complicated when more than three edges are crossed. Heuristics need to be codified in order to guarantee agreement with the aforementioned validity rules, thereby adding further operations to be performed, including a greater number of edge-coplanarity tests. In these situations, the savings enjoyed by utilizing the FIG. 7 configuration table are of greater magnitude. For example, if five edges are crossed, the speedup factor would be approximately $((3+2+1) \times (4 \times 10+1)/(5+1)-40$, when considering the combinations of the five edges.

Other factors contribute to the efficient generation of isosurface image data when utilizing the teachings of the invention. In particular, the use of preset relationships among the vertices, edges, and faces of a tetrahedron accelerates the isosurface image data generation process as taught herein by again eliminating costly numerical operations.

As an illustration, consider the operation of determining the isofacet vertices that coincide with the object boundary.

Using the matrix of faces between edges (as shown in FIG. 6), followed by applying the coincidence flag to determine coincidence of two turn points (on tetrahedron edges) with the object boundary, a single matrix access is required (approximately equivalent to two integer operations).

However, without precomputed classifications, a search must be performed to determine which, if any, of the volume element faces contain the tetrahedron edges with the turn points. For a typical hexahedral volume element, 6×2×2× 6=144 integer comparisons must be performed. A speedup factor of 144/2=72 is therefore realized by applying the present classifications.

With respect to display generation per se, utilizing the isosurface image data generated utilizing the techniques taught herein, the augmentation of a boundary-coincidence indicator to each turnpoint description in the turnpoint catalog allows for rapid display of the intersections of the isosurfaces with the external faces of the mesh. Recording the boundary coincidences eliminates the need for computing the intersections of the boundary faces with the isosurfaces.

For example, referring again to tetrahedron 801 of FIG. 8 and noting from FIG. 3 that the face (44,60,64) is external, it can be seen that two surface contour segments, 802 and 803, cross this face. With the boundary coincidence indicators in place, only 4 integer comparisons need to be performed to determine whether or not to display the segments between the turn points as contour segments.

Without the coincidence data present, each edge of the external face would need to be searched for turn points. Once the turn points are found, secondary searches would need to be performed to determine the correct connectivity. Assuming that the turn points are already stored in the turnpoint catalog (to avoid any duplicate floating point operation), these searches amount to 2×2×3=13 integer operations, yielding a speedup factor of 12/4=3.

Finally, the independence of the tetrahedral subelements from one another allows for advantage to be taken of present day parallel processing techniques. The tetrahedra in the tetrasets can each be assigned to an independent processor when determining the isofacets it contains, and furthermore, each value-step found in the tetrahedron can be assigned a separate processor. The speedup factor can be as large as the total number of tetrahedra times the number of value-steps.

Figure 10:
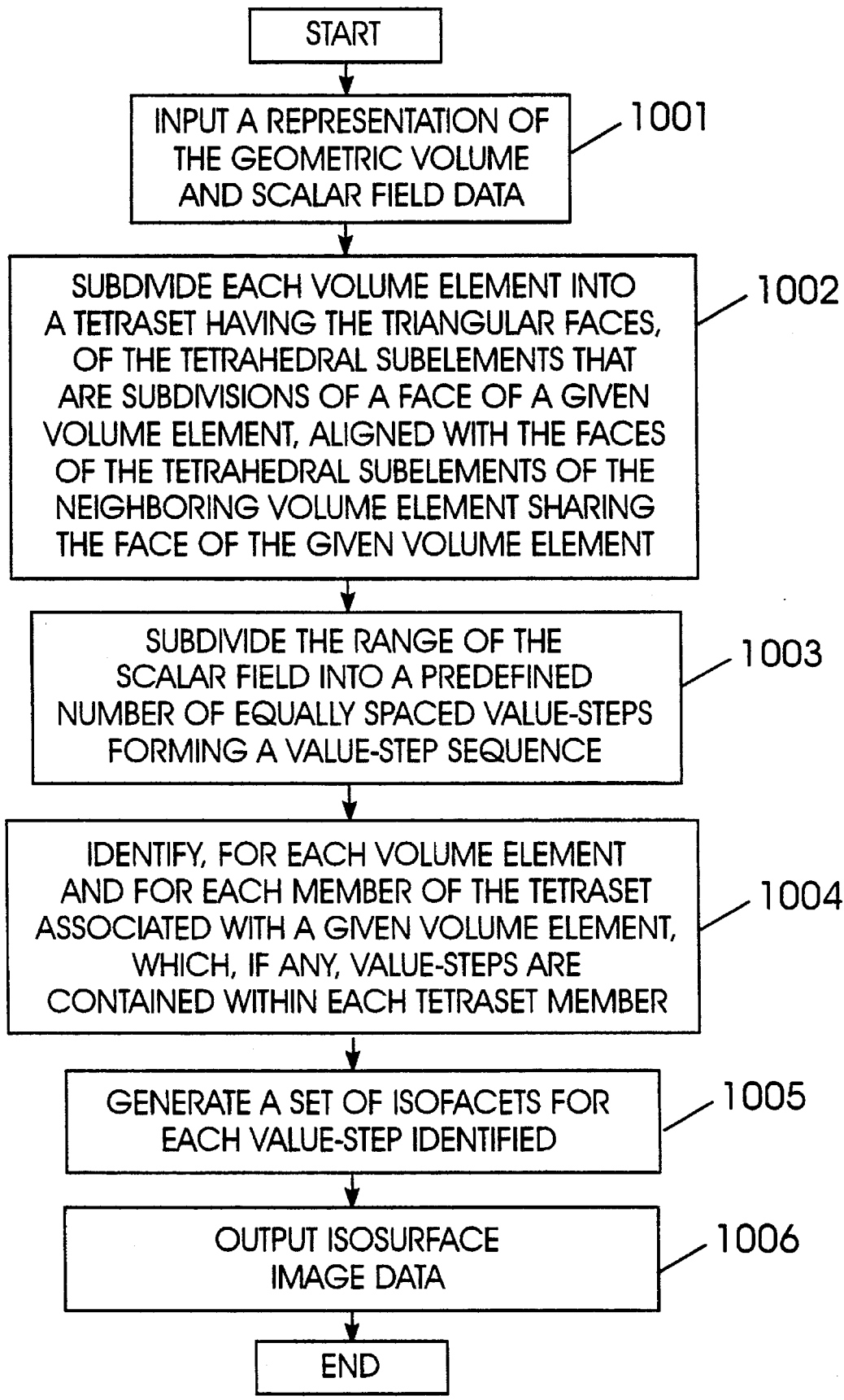
FIG. 10 depicts, in the form of a flowchart, the process steps executed by a preferred embodiment of the isosurface generator contemplated by the invention.

To summarize the process steps executed by a preferred embodiment of the isosurface generator contemplated by the invention, reference should now be made to FIG. 10. FIG. 10 depicts, in the form of a flowchart, a process for generating isosurfaces utilizing a digital computer and associated storage means, wherein (1) a given geometric volume represented by a set of points in three-dimensional space together with connectivity data defining a set of volume elements which subdivide said geometric volume and (2) a scalar field associated with said set of points, having a single scalar value associated with each point in said set of points, is stored in said storage means (providing the input referred to at block 1001 of FIG. 10), comprising the steps of: (a) subdividing each volume element into a tetraset (shown performed at block 1002 of FIG. 10) in such a way that the triangular faces of the tetrahedral subelements that are subdivisions of a face of a given volume element align with the faces of the tetrahedral subelements of the neighboring volume element sharing the face of the given volume element; (b) subdividing the range of said scalar field (shown performed at block 1003 of FIG. 10) into a predefined number of equally spaced value-steps forming a value-step sequence; (c) identifying (shown performed at block 1004 of FIG. 10), for each volume element and for each member of the tetraset associated with a given volume element, which, if any, value-steps are contained within each tetraset member; and (d) generating (shown at block 1005 of FIG. 10) a set of isofacets for each value-step identified in step (c).

To further summarize the invention, based on what has been disclosed hereinbefore, one skilled in the art will now readily appreciate that the step of generating, shown at block 1005 of FIG. 10, is performed, according to the preferred embodiment of the invention, by utilizing a predefined isofacet configuration table stored in the aforementioned storage means.

Additionally, those skilled in the art will also now appreciate that the step of identifying, shown at block 1004 of FIG. 10, is performed, according to a preferred embodiment of the invention, utilizing predefined tetrahedron component labeling data, stored in the storage means, to provide an index into said isofacet configuration table.

Finally, it will be appreciated that the preferred embodiment of the invention contemplates that each isofacet, in the set of isofacets generated utilizing said predefined isofacet configuration table, is expressed in terms of said predefined tetrahedron component labeling data when producing the isosurface image data output shown at block 1006 of FIG. 10.

The invention described herein, both in general terms and with respect to the specific cube example, can be used to generate isosurface image data that in turn can be used to visualize any scalar field on and within a discretized volume. Such scalars may represent pressure, turbulence energy, temperature, stress, or any other scalarized parameter mapped over three dimensions. Regarding such isosurfaces, the triangular isofacet formulation generated by the isosurface generator taught herein, supports the following interactive capabilities:

(1) displaying isosurfaces in selected value-step intervals;
(2) displaying intersections with arbitrary geometries to form segmented contour lines on the intersection region; and
(3) displaying contours on the surface of the object by making use of the flag indicating isofacet vertex coincidence with the object skin. All pairs of isofacet vertices coinciding with the object boundary can be interpreted directly as segments of surface contours.

If advanced rendering in a high-quality graphics environment is desired, the isofacet formulation utilized by the invention allows for curved isofacet edges and patches. Advanced techniques, including shading, translucency, and reflections, can be applied directly to each isofacet to produce an enhanced rendering of the isosurfaces. Also, intersections with curved objects is facilitated. On less sophisticated platforms, the isofacet formulation allow also for application to linear patches.

What has been described in detail hereinabove are methods and apparatus meeting all of the afore stated objectives. As previously indicated, those skilled in the art will recognize that the foregoing description has been presented for the sake of illustration and description only. It is not intended to be exhaustive or to limit the invention to the precise from disclosed, and obviously many modifications and variations are possible in light of the above teaching.

The embodiments and examples set forth herein were presented in order to best explain the principles of the instant invention and its practical application to thereby enable others skilled in the art to best utilize the instant invention in various embodiments and with various modifications as are suited to the particular use contemplated.

It is, therefore, to be understood that the claims appended hereto are intended to cover all such modifications and variations which fall within the true scope and spirit of the invention.

What is claimed is:

1. A method for generating isosurfaces utilizing a digital computer and associated storage means, where (1) a geometric volume, represented by a set of points in three-dimensional space together with connectivity data defining a set of volume elements which subdivide said geometric volume, and (2) a scalar field associated with said set of points, a single scalar value within a range being associated with each point in said set of points, are stored in said storage means, comprising the steps of:

(a) subdividing each volume element into a tetraset of linear tetrahedral subelements having triangular faces in such a way that the triangular faces of a given one of the linear tetrahedral subelements that are subdivisions of a face of a first volume element align with the faces of a given one of the tetrahedral subelements of a second volume element sharing the face of the first volume element;

(b) subdividing the range of said scalar field into a predefined number of equally spaced value-steps forming a value-step sequence;

(c) identifying, for each volume element and for each member of the tetraset associated with a given volume element, which, if any, value-steps are contained within each tetraset member; and (d) generating a set of isofacets for each value-step identified in step (c).

2. A method as set forth in claim 1 wherein said step of identifying is performed utilizing predefined tetrahedron component labeling data stored in said storage means.

3. A method as set forth in claim 1 wherein said step of generating is performed utilizing a predefined isofacet configuration table stored in said storage means.

4. A method as set forth in claim 3 wherein said step of identifying is performed utilizing predefined tetrahedron component labeling data, stored in said storage means, to provide an index into said isofacet configuration table.

5. A method as set forth in claim 4 wherein each isofacet, in the set of isofacets generated utilizing said predefined isofacet configuration table, is expressed in terms of said predefined tetrahedron component labeling data.

6. A method as set forth in claim 1 further comprising the step of displaying isosurface image data utilizing the set of isofacets generated in step (d) for each value-step in said value-step sequence.

7. A method as set forth in claim 6 wherein said step of displaying isosurface image data is performed utilizing a selected subsequence of said value-step sequence.

8. A method as set forth in claim 1 further comprising the step of storing, in said storage means, a representation of the set of isofacets generated in step (d) for each value-step in said value-step sequence.

9. A method as set forth in claim 8 further comprising the step of displaying isosurface image data utilizing the representation of the set of isofacets stored in said storage means.

10. A method as set forth in claim 9 wherein said step of displaying isosurface image data further comprises the step of dynamically repositioning said isosurface image data utilizing the representation of said set of isofacets stored in said storage means.

11. A method as set forth in claim 1 further comprising the step of identifying, for each isofacet in a given set of isofacets, which, if any, edges of the isofacet coincide with the surface of said geometric volume forming a segment of a surface contour line.

12. A method as set forth in claim 11 further comprising the step of displaying surface contour line image data utilizing the isofacet edges identified as coinciding with the surface of said geometric volume.

13. A method as set forth in claim 12 wherein said step of displaying surface contour line image data is performed utilizing a selected subsequence of said value-step sequence.

14. A method as set forth in claim 1 wherein said step of subdividing each volume element into a tetraset is performed utilizing a forest fire algorithm.

15. A method for generating isosurfaces utilizing a digital computer and associated storage means, wherein (1) a geometric volume represented by a set of points in three-dimensional space together with connectivity data defining a set of volume elements which subdivide said geometric volume and (2) a scalar field associated with said set of points, wherein a single scalar value within a range is associated with each point in said set of points, is stored in said storage means, comprising the steps of:

(a) subdividing the range of said scalar field into a predefined number of equally spaced value-steps forming a value-step sequence; and (b) determining the isofacets contained within each volume element as a function of the predefined number of equally spaced value-steps, forming the value-step sequence, into which the range of said scalar field is divided.

16. A method as set forth in claim 15 further comprising the step of generating the set of isofacets determined in step (b) utilizing a predefined isofacet configuration table.

17. A method as set forth in claim 15 wherein said step of determining further comprises the step of subdividing each volume element into a tetraset.

18. A method for generating isosurfaces utilizing a plurality of parallel processors and storage means associated with said parallel processors, wherein (1) a geometric volume represented by a set of points in three-dimensional space together with connectivity data defining a set of volume elements which subdivide said geometric volume, and (2) a scalar field associated with said set of points, wherein a single scalar value within a range is associated with each point in said set of points, are stored in said storage means, comprising the steps of:

(a) subdividing each volume element into a tetraset of linear tetrahedral subelements having triangular faces in such a way that the triangular faces of a given one of the linear tetrahedral subelements that are subdivisions of a face of a first volume element align with the faces of a given one of the tetrahedral subelements of a second volume element sharing the face of the first volume element;

(b) subdividing the range of said scalar field into a predefined number of equally spaced value-steps forming a value-step sequence;

(c) identifying, for each volume element and for each member tetrahedral element of the tetraset associated with a given volume element, which, if any, value-steps are contained within each tetraset member; and (d) assigning each member tetrahedral element from a given tetraset, whenever a plurality of such member tetrahedral elements exists, to separate ones of said plurality of parallel processors to determine the isofacets for each value-step identified in step (c).

19. A method as set forth in claim 18 further comprising the step of assigning each of a plurality of value-steps identified as being contained within a given member tetrahedral element in a given tetraset, whenever such a plurality of value-steps exists, to separate ones of said plurality of parallel processors to determine the isofacets for each value-step identified in step (c).

20. A method for generating isosurfaces utilizing a plurality of parallel processors and storage means associated with said parallel processors, wherein (1) a geometric volume represented by a set of points in three-dimensional space together with connectivity data defining a set of volume elements which subdivide said geometric volume, and (2) a scalar field associated with said set of points, wherein a single scalar value within a range is associated with each point in said set of points, are stored in said storage means, comprising the steps of:

(a) subdividing each volume element into a tetraset of linear tetrahedral subelements having triangular faces in such a way that the triangular faces of a given one of the linear tetrahedral subelements that are subdivisions of a face of a first volume element align with the faces of a given one of the tetrahedral subelements of a second volume element sharing the face of the first volume element;

(b) subdividing the range of said scalar field into a predefined number of equally spaced value-steps forming a value-step sequence;

(c) identifying, for each volume element and for each member tetrahedral element of the tetraset associated with a given volume element, which, if any, value-steps are contained within each tetraset member; and (d) assigning each of a plurality of value-steps identified as being contained within a given member tetrahedral element in a given tetraset, whenever such a plurality of value-steps exists, to separate ones of said plurality of parallel processors to determine the isofacets for each value-step identified in step (c).

21. Apparatus for generating isosurfaces utilizing a digital computer and associated storage means, wherein (1) a geometric volume represented by volume element data including a set of points in three-dimensional space together with connectivity data defining a set of volume elements which subdivide said geometric volume, and (2) a scalar field associated with said set of points, having a single scalar value within a range associated with each point in said set of points, are stored in said storage means, comprising:

(a) means for subdividing, coupled to said storage means and forming a part of said digital computer, each volume element represented by the volume element data stored in said storage means, into a tetraset of linear tetrahedral subelements having triangular faces in such a way that the triangular faces of a ven one of the tetrahedral subelements that are subdivisions of a face of a first volume element align with the faces of a given one of the tetrahedral subelements of a second volume element sharing the face of the first volume element;

(b) a value-step sequence generator, coupled to said storage means and forming a part of said digital computer, for determining the range of the scalar values stored in said storage means and for subdividing said range into a predefined number of equally spaced value-steps forming a value-step sequence;

(c) means for identifying, forming a part of said digital computer, for each volume element and for each member of the tetraset associated with a given volume element, which, if any, value-steps are contained within each tetraset member; and (d) means for generating, forming a part of said digital computer, a set of isofacets for each value-step identified by said means for identifying.

22. Apparatus as set forth in claim 21 wherein said means for identifying is coupled to said storage means and utilizes predefined tetrahedron component labeling data stored in a first data set resident in said storage means.

23. A method as set forth in claim 22 wherein said means for generating is coupled to said storage means and utilizes a predefined isofacet configuration table stored in a second data set resident in said storage means.

24. Apparatus as set forth in claim 23 wherein said means for identifying further comprises means for indexing into said second data set utilizing the data stored in said first data set.

25. Apparatus as set forth in claim 24 wherein said means for generating expresses each isofacet, in the set of isofacets generated utilizing said predefined isofacet configuration table, in terms of the data stored in said first data set.

26. Apparatus as set forth in claim 21 further comprising means for displaying isosurface image data, coupled to said means for generating, utilizing the set of isofacets generated by said means for generating.

27. Apparatus as set forth in claim 26 wherein said means for displaying isosurface image data further comprises means for dynamically repositioning said isosurface image data.

28. Apparatus as set forth in claim 21 wherein said means for identifying is operative to identify, for each isofacet in a given set of isofacets, which, if any, edges of a given isofacet are colocated with the surface of said geometric volume forming a segment of a surface contour line.

29. Apparatus as said forth in claim 28 further comprising means for displaying surface contour line image data, coupled to said means for identifying, utilizing the isofacet edges identified as being colocated with the surface of said geometric volume by said means for identifying.

30. Apparatus for generating isosurfaces utilizing a digital computer and associated storage means, wherein (1) a geometric volume represented by volume element data including a set of points in three-dimensional space together with connectivity data defining a set of volume elements which subdivide said geometric volume, and (2) a scalar field associated with said set of points, wherein a single scalar value within a range is associated with each point in said set of points, are stored in said storage means, comprising:

(a) a value-step sequence generator, coupled to said storage means and forming a part of said digital computer, for determining the range of the scalar values stored in said storage means and for subdividing said range into a predefined number of equally spaced value-steps forming a value-step sequence; and (b) means for determining, forming a part of said digital computer, the isofacets contained within each volume element as a function of a predefined number of equally spaced value-steps, forming a value-step sequence, into which the range of said scalar field is divided.

31. Apparatus as set forth in claim 30 wherein said means for determining further comprises means for generating the set of isofacets determined by said means for determining utilizing a predefined isofacet configuration table.

32. Apparatus as set forth in claim 31 wherein said means for determining is operative to subdivide each volume element into a tetraset.

33. Apparatus for generating isosurfaces utilizing a plurality of parallel processors and storage means associated with said parallel processors, wherein (1) a geometric volume represented by volume element data including a set of points in three-dimensional space together with connectivity data defining a set of volume elements which subdivide said geometric volume, and (2) a scalar field associated with said set of points, wherein a single scalar value within a range is associated with each point in said set of points, are stored in said storage means, comprising:

(a) means for subdividing, coupled to said storage means, each volume element represented by the volume element data stored in said storage means, into a tetraset of linear tetrahedral subelements having triangular faces in such a way that the triangular faces of a given one of the tetrahedral subelements that are subdivisions of a face of a first volume element align with the faces of a given one of the tetrahedral subelements of a second volume element sharing the face of the first volume element;

(b) a value-step sequence generator, coupled to said storage means, for determining the range of the scalar values stored in said storage means and for subdividing said range into a predefined number of equally spaced value-steps forming a value-step sequence;

(c) means for identifying, including said plurality of parallel processors, for each volume element and for each member of the tetraset associated with a given volume element, which, if any, value-steps are contained within each tetraset member; and (d) means for assigning each member tetrahedral element from a given tetraset, whenever a plurality of such member tetrahedral elements exists, to separate ones of said plurality of parallel processors to determine the isofacets for each value-step identified by said means for identifying.

34. Apparatus as set forth in claim 33 further comprising means for assigning each of a plurality of value-steps identified as being contained within a given member tetrahedral element in a given tetraset, whenever such a plurality of value-steps exists, to separate ones of said plurality of parallel processors to determine the isofacets for each value-step identified by said means for identifying.

35. Apparatus for generating isosurfaces utilizing a plurality of parallel processors and storage means associated with said parallel processors, wherein (1) a geometric volume represented by volume element data including a set of points in three-dimensional space together with connectivity data defining a set of volume elements which subdivide said geometric volume, and (2) a scalar field associated with said set of points, wherein a single scalar value within a range is associated with each point in said set of points, are stored in said storage means, comprising:

(a) means for subdividing, coupled to said storage means, each volume element represented by the volume element data stored in said storage means, into a tetraset of linear tetrahedral subelements having triangular faces in such a way that the triangular faces of a given one of the tetrahedral subelements that are subdivisions of a face of a first volume element align with the faces of a given one of the tetrahedral subelements of a second volume element sharing the face of the first volume element;

(b) a value-step sequence generator, coupled to said storage means, for determining the range of the scalar values stored in said storage means and for subdividing said range into a predefined number of equally spaced value-steps forming a value-step sequence;

(c) means for identifying, including said plurality of parallel processors, for each volume element and for each member of the tetraset associated with a given volume element, which, if any, value-steps are contained within each tetraset member; and (d) means for assigning each of a plurality of value steps identified as being contained within a given member tetrahedral element in a given tetraset, whenever such a plurality of value-steps exists, to separate ones of said plurality of parallel processors to determine the isofacets for each value-step identified by said means for identifying.

* * * * *